United States Patent
Lydzinski et al.

(12)

(10) Patent No.: US 6,280,514 B1
(45) Date of Patent: *Aug. 28, 2001

(54) PROCESS FOR MAKING A FOAMED POLYSACCHARIDE AQUEOUS-BASED ADHESIVE

(75) Inventors: David W. Lydzinski, Belle Mead; Christian E. Russell, High Bridge, both of NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/602,736

(22) Filed: Jun. 23, 2000

(51) Int. Cl.$^7$ ................................. C08H 0/01; C08J 9/30
(52) U.S. Cl. ................ 106/122; 106/210; 106/215.2; 106/215.3; 106/215.4; 521/65; 521/84.1
(58) Field of Search ............................ 521/84.1; 106/122, 106/215.2, 215.3, 215.4, 210

(56) References Cited

U.S. PATENT DOCUMENTS

| | | | | |
|---|---|---|---|---|
| 5,043,196 | * | 8/1991 | Lacourse et al. | 521/84.1 |
| 5,153,037 | * | 10/1992 | Altieri | 521/84.1 |
| 5,272,181 | * | 12/1993 | Boehmer et al. | 521/84.1 |
| 5,736,586 | * | 4/1998 | Bastioli et al. | 521/84.1 |
| 5,756,556 | * | 5/1998 | Tsai et al. | 521/94.1 |
| 5,801,207 | * | 9/1998 | Bastioli et al. | 521/84.1 |
| 5,840,777 | * | 11/1998 | Eagles et al. | 521/84.1 |
| 5,854,345 | * | 12/1998 | Xu et al. | 521/84.1 |
| 5,922,379 | * | 7/1999 | Wang | 521/84.1 |

* cited by examiner

Primary Examiner—Morton Foelak
(74) Attorney, Agent, or Firm—Cynthia L. Foulke; Thomas F. Roland

(57) ABSTRACT

A process for producing an aqueous-based foamed polysaccharide is presented. The process involves combining a polysaccharide, a foam generator and water, then applying energy to the combination to produce a foamed adhesive.

22 Claims, No Drawings

PROCESS FOR MAKING A FOAMED POLYSACCHARIDE AQUEOUS-BASED ADHESIVE

FIELD OF THE INVENTION

This invention relates a novel process for producing a foamed polysaccharide aqueous-based adhesive. The foamed polysaccharide aqueous-based adhesive provides a natural-based alternative to foamed synthetic adhesives.

BACKGROUND OF THE INVENTION

Foamed adhesives show improved economics and performance over adhesives which are not foamed. Since foamed adhesives do not penetrate porous surfaces to the same extent as non-foamed adhesives, the open time increases and the tendency for pre-cure decreases. In addition, at any given film thickness, a foamed adhesive contains less water than an unfoamed adhesive. Less water in the adhesive leads to little or no grain raise, and improved non-curl. Foamed adhesives also have the ability to hold out on a substrate surface to a greater extent than unfoamed adhesives, resulting in less wasted adhesive.

Synthetic resin-based foamable adhesives are known in the art. U.S. Pat. No. 4,561,918 describes a foamed adhesive of an ethylene/vinyl acetate copolymer. U.S. Pat. No. 5,696,174 describes a method for producing a foam having increased stability, by using a composition having both a long-chain organic cation-forming compound, and a long-chain organic anion-forming compound. Foams produced from synthetic polymers and natural rubber emulsions are described.

JP 57143370 describes an aqueous adhesive in which air bubbles are mixed with a synthetic polymer or starch by mechanical stirring or chemical reaction. No surfactant is described. JP 62064877 describes a foamed aqueous adhesive having a foam stabilizer surfactant. The adhesive polymer is listed as either a water soluble resin (starch, cellulose derivatives, gelatin and polyvinyl alcohol) or a water dispersible synthetic resin. All of the examples are directed to synthetic resins.

While methods have been proposed for the foaming of any polymer adhesive, both synthetic and natural, success has been demonstrated only with synthetic polymers. Foamed polysaccharide-based adhesives tend to be unstable and dissipate within a few minutes. There has been a long-felt need to find a process for foaming a natural (polysaccharide-based) aqueous polymer adhesive which would provide a highly stable, consistent foam. Surprisingly, the process of the present invention produces a highly stable and consistent aqueous foamed adhesive. The high stability and consistency of the foam allow its use in manufacturing applications requiring extended usage times. The foamable water-based adhesive produced by the process of the present invention offers a natural-based alternative to synthetic-based foamable adhesives currently on the market.

The problem with foamed dextrin or starch based adhesives is that the foam produced is unstable and dissipates within minutes. The addition of a filler allows for foam generated to remain consistent and stable for several hours, which is necessary in many cases to allow for extended usage time in many applications.

SUMMARY OF THE INVENTION

Accordingly it is an object of the present invention to provide a process for producing a stable, consistent aqueous polysaccharide-based foamed adhesive. Specifically the invention provides a process comprising:

a) combining:
   1) a polysaccharide;
   2) a foam generator;
   3) water to produce a foamable adhesive composition; and
b) applying energy to produce a foamed adhesive.

Another object of the invention is a foamed adhesive produced by the process described above.

DETAILED DESCRIPTION OF THE INVENTION

The process of the present invention involves applying energy to a foamable, polysaccharide-based adhesive composition which is the combination of a polysaccharide, foam generator and water, to produce a foam.

Polysaccharides are known in the art as natural-based adhesives. Polysaccharides useful in the invention include starch, dextrin, cellulose, gums or combinations thereof. Particularly useful are the starches and dextrins including native, converted or derivatized. Such starches include those derived from any plant source including corn, potato, wheat, rice, sago, tapioca, waxy maize, sorghum and high amylose starch such as high amylose corn, i.e. starch having at least 45% amylose content by weight. Starch flours may also be used. Also included are the conversion products derived from any of the former bases, such as, for example, dextrins prepared by hydrolytic action of acid and/or heat; fluidity or thin boiling starches prepared by enzyme conversion or mild acid hydrolysis; oxidized starches prepared by treatment with oxidants such as sodium hypochlorite; and derivatized or modified starches such as cationic, anionic, amphoteric, non-ionic, crosslinked and hydroxypropyl starches. Other useful polysaccharides are cellulose materials such as carboxymethylcellulose, hydroxypropyl cellulose and hydroxypropyl methylcellulose, and gums such as guar, xanthan, pectin and carrageenan.

The polysaccharides in the process of the present invention are used at from about 3 to about 90 percent by weight, preferably from 30 to 70 percent by weight and most preferably from 30 to 50 percent by weight, based on the foamable composition as a whole.

Modified polysaccharides are especially useful in the present invention. Modified starches include, but are not limited to, those modified with an alkyl succinic anhydride. Preferred are octenyl succinic anhydride (OSA) and dodecenyl succinic anhydride (DDSA) modified starches or dextrins. It has been found that the use of such modified starches and dextrins increases the level of foam in the foamable adhesives.

A foam generator is also present in the foamable composition produced by the process of the present invention. Foam generators include surface-active agents. Examples of surface-active agents include anionic, cationic, amphoteric, or nonionic surfactants, or mixtures thereof. Suitable anionic surfactants include, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, and esters of sulfosuccinic acid. Suitable cationic surfactants include, alkyl quaternary ammonium salts, and alkyl quaternary phosphonium salts. Suitable non-ionic surfactants include the addition products of 5 to 50 moles of ethylene oxide adducted to straight-chain and branched-chain alkanols having 6 to 22 carbon atoms, alkylphenols, higher fatty acids, higher fatty acid amines, primary or secondary higher alkyl amines, and block copolymers of propylene oxide with ethylene oxide, and mixtures thereof.

The foam generator of the present invention is used at a level of from 0.05 to 20 percent by weight, and preferably at from 0.2 to 2 percent by weight, based on the foamable composition as a whole.

The foamable composition contains from 10 to 97 percent by weight of water. Preferably the composition contains from 25 to 50 percent by weight of water.

The foamable composition of the present invention may optionally contain one or more fillers. Fillers useful in the present invention include those fillers known in the art as adhesives fillers. Such fillers include bentonite, calcium carbonate, calcium silicate, clay, mica, nut shell flours, silica, talc, uncooked starches, and wood flour. Fillers are useful in a range of up to 50 percent by weight of the foamable composition, and most preferably from 5 to 20 percent by weight.

In addition to fillers, other additives typical of adhesive compositions can be added to the foamable composition. Said additives include, but are not limited to, plasticizers, acids, waxes, catalysts, humectants, stabilizers, rheology modifers, synthetic resins, tackifiers, defoamers, polyvinyl alcohol, preservatives, crosslinkers such as borax or boric acid, bases such as sodium hydroxide, dyes, pigments, and other additives commonly used in the art.

Humectants for use in the present invention include, but are not limited to calcium chloride, diethylene glycol, glycerine, hexylene glycol, propylene glycol, magnesium chloride, sodium nitrate, sorbitol, corn syrup, sucrose and urea. Humectants are used at levels up to 60 percent by weight, and preferably at from 5 to 50 percent by weight, based on the adhesive composition.

The foamable adhesive composition has a viscosity, prior to foaming, of from 10 to 300,000 cps at 25° C. Preferably the viscosity of the foamable adhesive composition at 25° C. is from 1,000 to 5,000 cps.

The foamable adhesive composition of the invention is foamed by the addition of energy, by means known in the art such as, but not limited to, by mechanical and/or chemical means. Air or other gases are added to the foamable adhesive composition along with the addition of said energy to produce a stable, consistent foamed adhesive. Preferably air is used to produce the foamed adhesive. The adhesive foam may be produced by mechanical means such as mechanical stirring or agitation, introduction of gases or by chemical means.

The adhesive produced by the process of the present invention is useful in paper laminating, tube/corewinding, wood bonding, tissue and towel manufacture, coreless tube manufacture, personal care applications, polyolefin bonding, bag and sack manufacturing, bookbinding, cigarette making, bottle labeling, surface coatings and other adhesive applications.

This invention can be illustrated by the following non-limiting example.

EXAMPLE

The following example demonstrates the invention using several polysaccharides, several different surfactants, and several additives.

Foamable adhesive compositions were produced by mixing together the following ingredients. Each mixture was heated to 200° F., and held at temperature for 1 hour while stirring.

|  | A | B | C | D | E | F | G | H | I | J |
|---|---|---|---|---|---|---|---|---|---|---|
| water | 31.0 | 28.0 | 31.0 | 31.0 | 31.0 | 31.0 | 31.0 | 31.0 | 31.0 | 31.0 |
| clay | 9.0 | — | 9.0 | 9.0 | 9.0 | 9.0 | 9.0 | 9.0 | 9.0 | 9.0 |
| corn syrup | 10.0 | 10.0 | 10.0 | 10.0 | 10.0 | 10.0 | 10.0 | 10.0 | 10.0 | 10.0 |
| corn dextrin | 37.75 | 37.75 | 18.9 | 37.75 | 37.75 | 37.75 | 37.75 | 37.75 | — | — |
| amioca dextrin | — | — | — | — | — | — | — | — | 37.75 | — |
| potato dextrin | — | — | — | — | — | — | — | — | — | 37.75 |
| OSA modified corn dextrin | — | — | 18.9 | — | — | — | — | — | — | — |
| Defoamer | — | — | — | — | — | — | — | 0.23 | — | — |

Each mixture was then cooled to 140° F. and the following ingredients were added.

|  | A | B | C | D | E | F | G | H | I | J |
|---|---|---|---|---|---|---|---|---|---|---|
| borax | 2.91 | 2.91 | 2.91 | 2.91 | 2.91 | 2.91 | 2.91 | 2.91 | 2.91 | 2.91 |
| Sodium hydroxide (25% sol.) | 2.10 | 2.10 | 2.10 | 2.10 | 2.10 | 2.10 | 2.10 | 2.10 | 2.10 | 2.10 |
| glycerine | 1.00 | 1.00 | 1.00 | 1.00 | 1.00 | 1.00 | 1.00 | 1.00 | 1.00 | 1.00 |
| urea | 7.00 | 7.00 | 7.00 | 7.00 | 7.00 | 7.00 | 7.00 | 7.00 | 7.00 | 7.00 |

-continued

|  | A | B | C | D | E | F | G | H | I | J |
|---|---|---|---|---|---|---|---|---|---|---|
| preservative | 0.10 | 0.10 | 0.10 | 0.10 | 0.10 | 0.10 | 0.10 | 0.10 | 0.10 | 0.10 |
| sodium dioctyl sulfosuccinate | 0.10 | 0.10 | 0.10 | — | — | — | — | — | — | — |
| sodium laureth sulfate | — | — | — | — | 0.20 | — | — | — | — | — |
| sodium laurel sulfate | — | — | — | — | — | 0.20 | — | — | — | — |
| cocoamidopropyl betaine | — | — | — | — | — | — | 0.20 | — | 0.20 | 0.20 |

Foaming was measured by mixing 200 grams of each sample, at room temperature, in a Hobart mixer for 1 minute at a speed setting of 2. Density was measured before and after mixing, and the percent of foam calculated. Foam retention was observed after one hour. Poor retention means foam dissipated before one hour. Good retention means foam structure was maintained for over one hour. Percent foam and foam retention are shown in the following table.

|  | A | B | C | D | E | F | G | H | I | J |
|---|---|---|---|---|---|---|---|---|---|---|
| % Foam | 13.6 | 13.6 | 36 | 0 | 27.2 | 22.72 | 38.0 | 0 | 56.0 | 44.0 |
| Foam retention | good | poor | good | N/A | good | good | good | N/A | good | good |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A process for producing a foamed water-based adhesive comprising:
   a) combining:
      1) polysaccharide;
      2) a foam generator; and
      3) water to produce a foamable adhesive composition having a viscosity of from 10 to 300,000 cps at 25° C.; and
   b) applying energy to produce a foamed adhesive.

2. The process of claim 1 wherein said polysaccharide is a starch, dextrin or combination thereof.

3. The process of claim 2 wherein said polysaccharide comprises a modified starch or dextrin.

4. The process of claim 3 wherein said modified starch or dextrin comprises starch or dextrin modified with octenyl succinic anhydride, dodecenyl succinic anhydride, or mixtures thereof.

5. The process of claim 1 wherein said foamable adhesive composition comprises from 3 to 90 percent by weight of said polysaccharide.

6. The process of claim 5 wherein said foamable adhesive composition comprises from 30 to 70 percent by weight of said polysaccharide.

7. The process of claim 6 wherein said foamable adhesive composition comprises from 30 to 50 percent by weight of said polysaccharide.

8. The process of claim 1 comprising from 0.05 to 20 percent by weight of said foam generator.

9. The process of claim 8 comprising from 0.2 to 2.0 percent by weight of said foam generator.

10. The process of claim 1 comprising 10 to 97 percent by weight of water.

11. The process of claim 10 comprising 25 to 50 percent by weight of water.

12. The process of claim 1 wherein a filler is combined with said foamable adhesive composition prior to the application of energy to produce a foam.

13. The process of claim 12 wherein said filler comprises up to 50 percent by weight of said foamable adhesive composition.

14. The process of claim 13 wherein said filler comprises from 5 to 20 percent by weight of said foamable adhesive composition.

15. The process of claim 1 wherein said foamable adhesive composition further comprises an additive.

16. The process of claim 15 wherein said additive is selected from the group consisting of plasticizers, waxes, acids, catalysts, humectants, stabilizers, rheology modifers, synthetic resins, tackifiers, defoamers, polyvinyl alcohol, preservatives, crosslinkers such as borax or boric acid, sodium hydroxide, dyes, pigments, and mixtures thereof.

17. The process of claim 1 wherein said foamable adhesive composition has a viscosity at 25° C. of from 10–300,000 cps.

18. The process of claim 16 wherein said foamable adhesive composition has a viscosity at 25° C. of from 1,000–5,000 cps.

19. The process of claim 1 wherein said energy is applied in the form of mechanical energy.

20. A foamed adhesive formed by the process of claim 1.

21. The process of claim 1 wherein the foam generator is a surface active agent.

22. The process of claim 21 wherein the surface active agent is selected from the group consisting of anionic surfactants, cationic surfactants, amphoteric surfactants, nonionic surfactants and mixtures thereof.

* * * * *